United States Patent [19]

Schmidt et al.

[11] Patent Number: 4,509,673
[45] Date of Patent: Apr. 9, 1985

[54] PROCESS FOR CREATING A SUPPORT MEANS FOR A COMPONENT PART TO BE REWORKED AND/OR REPAIRED AND A WELDING DEVICE OBTAINED ACCORDING TO SAID PROCESS

[75] Inventors: Werner Schmidt, Niederroth; Franz Jahn, Sigmertshausen, both of Fed. Rep. of Germany

[73] Assignee: Motoren-und Turbinen-Union Munchen GmbH, Munich, Fed. Rep. of Germany

[21] Appl. No.: 461,015

[22] Filed: Jan. 26, 1983

[30] Foreign Application Priority Data

Feb. 5, 1982 [DE] Fed. Rep. of Germany ....... 3203868

[51] Int. Cl.³ ...................... B23K 37/04; B23K 37/00
[52] U.S. Cl. ..................................... 228/212; 228/46; 228/222; 269/7
[58] Field of Search .................... 228/212, 46, 222; 269/7; 219/76.11

[56] References Cited

U.S. PATENT DOCUMENTS

| 1,490,191 | 4/1924 | Allcutt | 269/7 |
| 3,514,568 | 5/1970 | Frus et al. | 219/76.11 |
| 3,982,430 | 9/1976 | Pommellet et al. | 269/7 X |
| 4,230,928 | 10/1980 | Janssen | 219/76.11 |
| 4,233,487 | 11/1980 | Moriki et al. | 228/222 X |
| 4,339,867 | 7/1982 | Reznik | 228/212 X |

FOREIGN PATENT DOCUMENTS

| 3049359 | 7/1982 | Fed. Rep. of Germany | 269/7 |
| 194578 | 5/1967 | U.S.S.R. | 269/7 |
| 776848 | 11/1980 | U.S.S.R. | 269/7 |

Primary Examiner—Kenneth J. Ramsey
Attorney, Agent, or Firm—Walter W. Burns, Jr.

[57] ABSTRACT

A process for creating a support means for a component part of a usually complicated configuration that is to be reworked and/or repaired, by surrounding the surfaces of the component part that are to be supported by a meltable alloy which, in the cooled state, supports said component, and by removal of the meltable alloy after the treatment of the component part by heating is characterized in that, before the pouring, cooling pipes are placed in the support area to be cooled during the treatment of the component part, with said cooling pipes, during the pouring process, being embedded by said meltable alloy. Thus, a support means is created that can be produced in a simple and rapid manner, for a component part having a complicated support surface, which can also be well cooled. A support means of this type is especially suitable as a welding device for a component part to be repaired which is to be repaired, for example, by micro-plasma build-up welding.

14 Claims, 6 Drawing Figures

PROCESS FOR CREATING A SUPPORT MEANS FOR A COMPONENT PART TO BE REWORKED AND/OR REPAIRED AND A WELDING DEVICE OBTAINED ACCORDING TO SAID PROCESS

This invention concerns a process for creating a support means for a component part to be reworked and/or repaired by pouring a meltable alloy around the surfaces of the component that are to be supported, with said meltable alloy, in the cooled state, supporting the component, and by removing the meltable alloy after the treatment of the component part by heating said meltable alloy; as well as a special support means to be created according to said process in the form of a welding device.

Faulty machining on partially finished or completely finished, usually complicated component parts or workpieces is increasingly corrected by a special reworking or aftertreatment, such as building up welding. In the case of wear or damage through operating stress, complicated component parts, such as engine components, may also be repaired by means of special aftertreatment measures. Thus, it is often possible to save very expensive parts from being scrapped so that they can be used again.

When repairing a complicated component by means of building-up welding, it is an important prerequisite for the success of a repair that the component part be supported in an exact and form-adapted manner at selected points and protected from the damaging effect of heat from the fusion-welding process. An inadmissibly large influence of heat results in shrinkage and distortion.

Known support means for the aftertreatment of complicated component parts containing, for example, also reliefs, consist of a plurality of individually manufactured clamping segments adapted to the support surface of the component part to be supported. The clamping segments are produced by mechanical machining and, by means of a gripping arrangement, are braced against one another in such a way that the component to be treated is disposed between it in a defined and precisely supported manner in order to be subjected to an aftertreatment process. The more complicated the parts, the more devices are required, increasing the necessary expenditures. The increased costs can frequently be accepted only in the case of the aftertreatment of new parts which are manufactured in large numbers. Since in the case of repairs, one usually deals with only small numbers, in many cases with only one expensive part, a costly and expensive device, for example, in the case of repair welding according to the state of the art is justified only in rare cases, especially in view of the uncertain chances of success in the case of repair welding, since the damaging influence of heat can result in shrinkage and distortion of the component part to be repaired.

A feature of the invention is the creation of a process for producing a support means of the initially mentioned type as well as the creation of a special supporting device for use as a welding device, which, because of its simplicity, is especially cost-effective and leads to good repair results so that even complicated component parts of small numbers or of single-part production can be aftertreated or repaired in a worthwhile manner.

The task on which the invention is based, in the case of the process according to the invention, is solved by the fact that, before the component part is surrounded by the poured substance, cooling pipes are placed in a support area that must be cooled during the treatment of the component part, with said cooling pipes, during the pouring process, being embedded by means of the meltable alloy.

Before the aftertreatment or repair, the embedded cooling pipes are connected to a suitable cooling system.

Expenditures are further reduced if the removed meltable alloy is reused for a new pouring process.

Just as the meltable alloy, once-used cooling pipes may also be reused for a new pouring process.

After the treatment of the component part, the meltable alloy is advantageously liquified at about 150° C. by heating, and is thus removed again from the component part after the treatment process.

Melting residues which may remain may be removed by a separate subsequent cleaning process which takes place as follows:

1. Degreasing by immersion in trichloroethylene or perchloroethylene;
2. Immersion of the component parts in an aqueous nitric-acid bath (53% by weight $HNO_3$) for at least 30 minutes;
3. Rinsing of the component part with cold and hot water.

In order to be able to easily remove the meltable alloy after the treatment of the component, the component part, according to another preferred process according to the invention, before the pouring-out is treated or coated at the surfaces to be supported by a parting compound. The cooling pipes may also be treated or coated with a parting compound.

Prefabricated cooling water ducts advantageously are pipes made of a material conducting heat well, such as copper, with said pipes being placed in the support area before the pouring process of the component part to be repaired, in loop form.

A support means created according to the process of the invention in the form of a welding device for a component part to be welded advantageously provides at least one negative mold of the component part which can be cooled and partially supports the component part, where the negative mold consists of a cast meltable alloy with at least one cooling pipe poured in which can be connected to a cooling system.

By means of the invention, a support means can be created simply and without consuming much time which can be used universally and is especially suited for components to be repaired that have complicated contours, even if the component part must be supported at inaccessible points in order to ensure a successful repair. The support means with integrated cooling ducts is especially suitable as a welding device because it not only permits an exactly defined support, but heat generated during the welding can also be led off so that there will be no shrinkage or distortion. The required meltable material is comparatively inexpensive and can be used repeatedly. The result is a very good cost/benefit ratio of a created support means which will affect the final decision in regard to the fact that even complicated component parts may again be prepared in single-part production (and be saved from being scrapped). In a simple manner, the support means permits an exact form adaptation to the individual shape of the workpiece to be repaired. The exact dimensions and shape of the part to be repaired are not important. Mechanical support means according to the state of the art are much more complicated to produce and therefore more expensive. Known means also only permit an insufficient support in the area of complicated support surfaces, where cooling is also difficult. In addition, known mechanical support means can also only be used to a limited extent even in the case of a series-produced piece, because in a series dimensions occur that vary from place to place, making a support difficult that is adapted to the precise shape.

An object of the invention is, therefore, an improved process for creating a support means for a welding process and device.

Another object of the invention is the creation of a process for producing a support means of the type described above as well as the creation of a special supporting device for use as a welding device, which, because of its simplicity, is especially cost-effective and leads to good repair results so that even complicated component parts of small numbers or of single-part production can be aftertreated or repaired in a worthwhile manner.

Another object of the invention is a process wherein, before a component part is surrounded by a poured substance, cooling pipes are placed in a support area that must be cooled during the treatment of the component part, with the cooling pipes, during the pouring process, being embedded by means of the meltable alloy.

Another object of the invention envisions, before the aftertreatment or repair, embedded cooling pipes are connected to a suitable cooling system.

Another object of the invention is reduction of cost by reuse for a new pouring process of the removed meltable alloy.

Another object of the invention is reduction of cost by reuse for a new pouring process of the once-used cooling pipes.

Another object of the invention is a process for creating a support means, especially a welding device, for a component part to be reworked and/or repaired, by pouring a meltable alloy around the surfaces of the component that are to be supported, with said meltable alloy, in the cooled state, supporting the component, and by removing the meltable alloy after the treatment of the component part by heating said meltable alloy, characterized in that, before the component part is surrounded by the poured substance, cooling pipes are placed in the support area to be cooled during the treatment of the component with said cooling pipes, during the pouring process being surrounded by the meltable alloy, with the exception of suitable connections.

Another object of the invention is a process for creating a support means for welding wherein a meltable alloy, after treatment of a component, is liquified by being heated to about 150° C. and is removed from the component part.

Another object of the invention is a process for welding wherein a meltable alloy, by being heated to about 150° C. is first roughly removed from a component part, and the component part is subsequently cleaned by suitable mweans to remove alloy residues.

Another object of the invention is a process for welding wherein a component part, before pouring, is treated or coated with a parting agent at areas to be supported and, cooling pipes are coated with a parting agent.

Another object of the invention is a process for welding wherein cooling pipes are made of a good heat conducting material, for example, copper.

Another object of the invention is a welding device for a component part to be welded comprising at least one coolable negative mold of the component partially supporting the component part, the negative mold comprising a meltable alloy poured onto the component part, having at least one embedded cooling duct means for connection to a cooling system.

Another object of the invention is a process for creating a support means during welding of a component part wherein the component part is prestressed in at least one local area thereof prior to pouring of meltable alloy therearound.

Another object of the invention is a welding device for a component part to be welded comprising means for cooling the component part during a welding operation, means for moldably fixing during a welding operation the position of at least one of the component parts and the means for cooling and means for prestressing at least one local area of the component part prior to applying the means for moldably fixing.

These and other objects, features, and advantages of the present invention will become more apparent from the following description when taken in connection with the accompanying drawings which show, for the purposes of illustration only, one embodiment in accordance with the present invention, and wherein.

Figure 1:
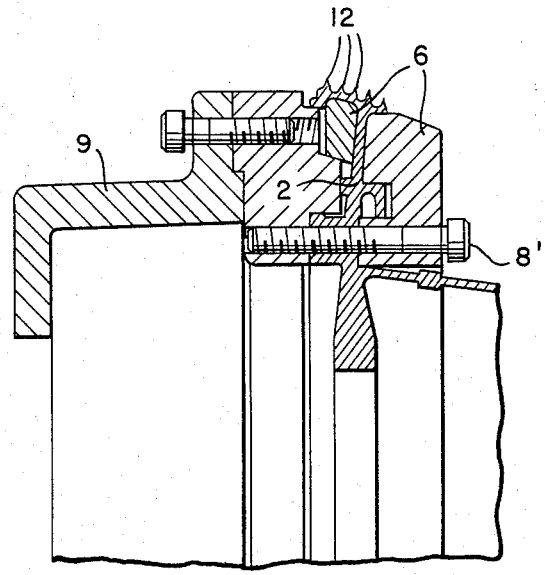
FIG. 1 shows a partial section through a support means according to the state of the art.

With reference to the drawings wherein like elements have like reference numerals, FIG. 1 shows a partial section of a high-pressure compressor rotor shaft 2 in need of repair, the radially outside labyrinth packings 12 of which that are in need of repair, are to be repaired by building-up welding. By means of a multipart support means, the component part 2 is flanged to a holding device that is symmetrical with respect to rotation.

The support means according to FIG. 1 represents the state of the art and consists of several clamping segments 6 of varying configuration which are adapted to the pertaining support surface of the component part 2. The clamping segment 6 that is on the left according to FIG. 1, in an annular shape, supports a relieved surface of the component part 2 of a complicated configuration and is divided for the purpose of assembly and disassembly. All clamping segments 6 are mechanically machined according to the configuration of the pertaining support surfaces of the component part 2. By means of a screwed joint 8' and an intermediate clamping ring, the clamping segments 6 are flanged to the holding device 9. It is apparent that the clamping segments 6 can only be adapted to the configuration of the component part 2 to be repaired with difficulty and considerable expenditure. For an assembly and a disassembly, individual clamping segments must consist of at least two parts. The heat generated during building-up welding is led off badly so that there may be shrinkage or distortion of the component part 2 to be repaired. Thus, considered as a whole, the known device is only suitable to a limited extent for a component part to be repaired of a complicated configuration, at least, if it is a single piece. In this case, it is usually not worthwhile to create an expensive and costly support means. The worn or damaged expensive component part 2 must be scrapped.

Figure 2:
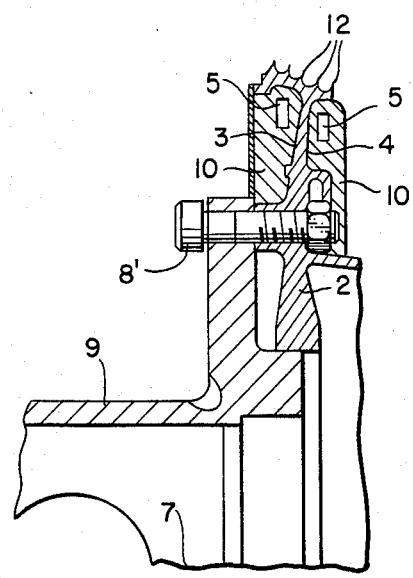
FIG. 2 shows an axial section of a support means according to the invention.

FIG. 2 shows the complicated part 2 that is in need of repair and is shown in FIG. 1 with a support means 1 according to the invention.

The support means 1 consists essentially of cooled parts 10 of a meltable alloy which, by means of a pouring process, are individually adapted to the surfaces 3, 4 to be supported of the component part 2 to be repaired. Cooling pipes 5 are placed in parts 10 of the meltable alloy in proximity of the surfaces 3, 4 to be supported in the area to be repaired, i.e., at the labyrinth packings 12 to be repaired. The cooling pipes 5 that are connected to a cooling system that is not shown lead off the heat generated during a building-up welding so that no major overall or local heating or overheating can occur in the component part 2 as well as in the mold 10. The mold and the component part 2 are not subjected to any significant distortion or shinkage during the repairing process.

The creation of the support means 1 according to FIG. 2 will now be described.

The high-pressure compressor rotor shaft 2 to be repaired is flanged to the holding device 9 by means of a screwed joint 8'. Subsequently, the holding device 9, together with the flanged component part 2, is turned by 90° in such a way that the rotor shaft 7 is vertical. Consequently, an annulus with an upper opening is created in the area of the surfaces 3 or 4 to be supported. The pertaining cooling duct 5 is placed in the annulus in such a way that both openings located on the end sides reach through the upper opening of the annulus. Subsequently, a low-melting alloy consisting of 60% tin is poured into the annulus, so that a mold part 10 of meltable alloy will be obtained. After the meltable alloy has cooled, the whole arrangement is turned by 180° so that the other annulus to be filled points to the top. After the pertaining cooling duct 5 is placed in it, the same melting alloy is poured into this annulus. When both meltable-alloy support areas 10 have solidified, the actual welding repair in the area of the labyrinth packings 12 can begin. During the repair, the connection openings of the cooling ducts 5 are connected to a cooling-water system in order to lead off a sufficient amount of the heat generated during the work. After the repair process, the arrangement in the area of the meltable-alloy parts 10 is heated to about 150° C., so that the meltable alloy parts liquify and are thus removed. Subsequently, the cooling ducts 5 are removed and the supporting surfaces 3, 4 are cleaned to remove the melting residues by a separate subsequent cleaning process which takes place as follows:

1. Degreasing by immersion in trichloroethylene or perchloroethylene;

2. Immersion of the component parts in an aqueous nitric-acid bath (53% by weight $HNO_3$) for at least 30 minutes;

3. Rinsing of the component part with cold and hot water.

The once-used meltable-alloy metal may be used again and again.

The cooling ducts 5 may also be used several times by means of a simple deformation.

Thus, by very simple and inexpensive means, an exact support means for a very complicated component part 2 to be repaired can be created which may be regenerated by micro-plasma building-up welding, for example. A meltable alloy (such as Cerrobend, Cerro Tru ®, 58% by weight Bi, 42% by weight Su, with melting point 138° C. or Fry Cap ®, 58% by weight Bi, 42% by weight Su, with melting point 138° C., is poured around the part to be repaired, with prefabricated cooling ducts (copper pipes) being embedded in said alloy. The meltable alloy takes over the support of the component part 2, and the fixing of the position of the cooling ducts 5, as well as the heat transfer from the welding point to the cooling water.

Figure 3:
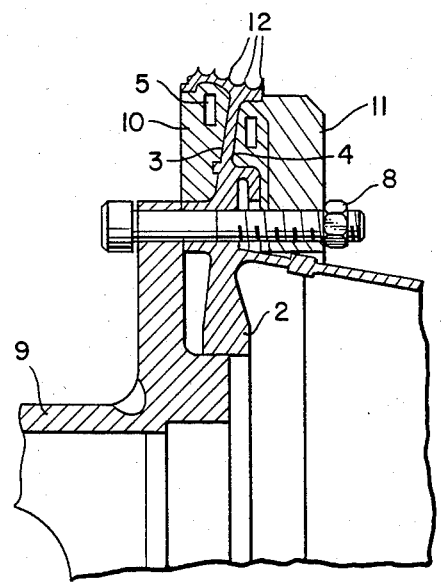
FIG. 3 shows an axial section corresponding to FIG. 2 through another embodiment according to the invention.

FIG. 3 shows a support means 1 similar to that of FIG. 2. In contrast to the embodiment according to FIG. 2, the meltable-alloy support ring 10 located on the right in FIG. 3 has an adapted holding ring 11 which, by means of a screwed joint 8 is screwed to the holding device 9. The holding ring 11 peripherally engages in the component part (rotor shaft) to be repaired, while being prestressed. This prestressing is used for balancing a possible axial distortion of the rotor shaft which might otherwise be caused during the repair welding.

In an alternative development of the embodiments according to FIGS. 2 and 3, more than two support parts 10 of a low-melting alloy may also be provided. The number and shape of the support parts depend on the configuration of the component 2 to be repaired. Individual areas of the component part to be repaired may be subjected to a targeted additional prestressing in order to locally achieve an increased supporting force for a repair process. This is achieved before the surrounding of the component by the meltable alloy, by an arrangement of suitable mechanical prestressing devices.

Figure 4:
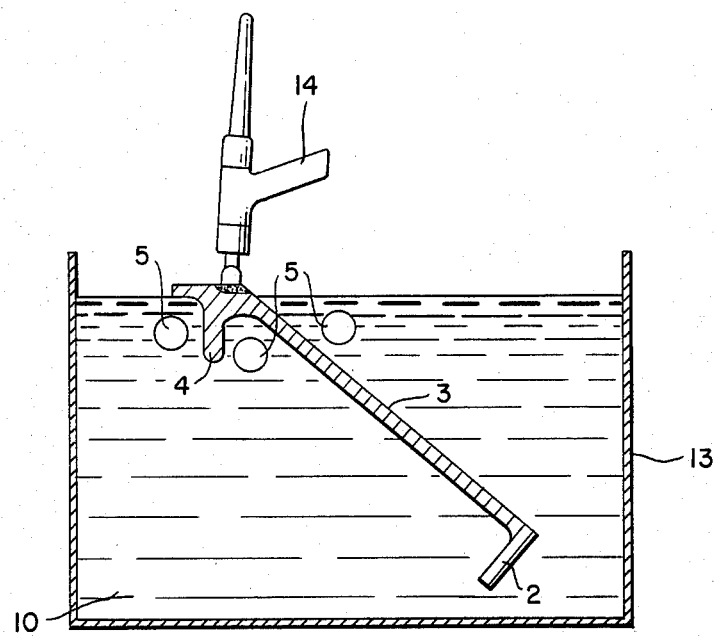
FIG. 4 shows a diagrammatic cross-sectional view through a component part with a complicated configuration which is poured into a meltable alloy and is subjected to building-up welding.
Figure 5:
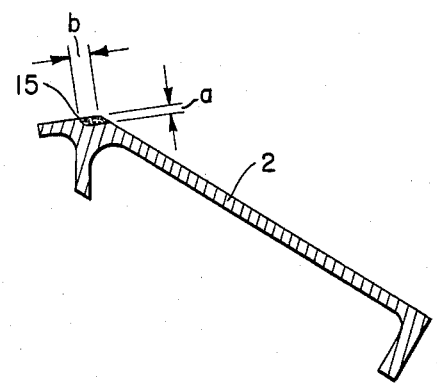
FIG. 5 shows a plan view of the component part according to FIG. 4.
Figure 6:
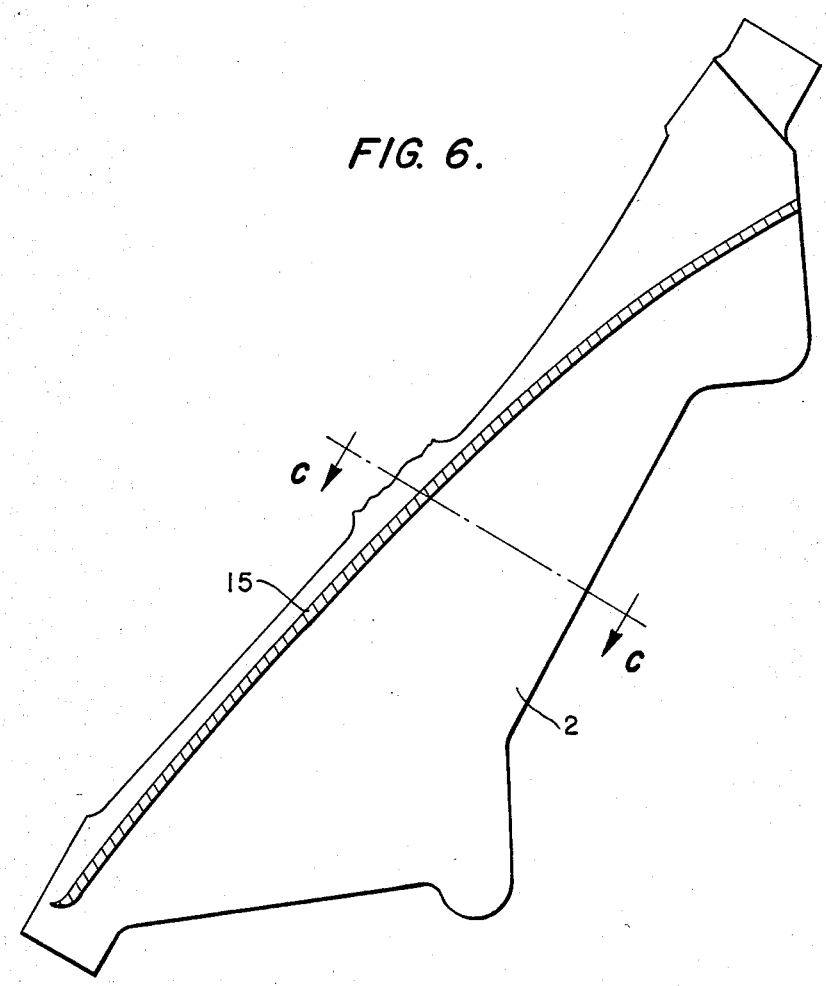
FIG. 6 shows a section of the component part according to FIGS. 4 and 5 along Line C—C.

The diagrammatic cross-sectional view shown in FIG. 4 is another complicated component 2 to be repaired, originally produced by profiling. The component part 2 (a crossarm on the outside of a thrust reverser of an engine or motor) is shown in plan view in FIG. 5 and in sectional view C—C of FIG. 5 in FIG. 6. The component is to be subjected to building-up welding in the area a×b according to FIG. 6. Without the material quantity a×b, the component 2 is ready for scrapping.

According to FIG. 4, the component part 2, with the area to be repaired pointing upward, is placed in a sheet-metal tank 13. Cooling-pipe loops 5 are placed in the area of the point to be repaired below and on the side of the component 2 in the sheet-metal tank 13, in which case the ends of the cooling pipes point upward. Subsequently, a liquified meltable alloy 10 is poured into the sheet-metal tank 13 which, after solidification, permits an exactly form-closing support of the component part 2 on the outside of the point to be repaired, in which case the cooling-pipe loops 5 (except for the connection pieces) are inside the poured substance. After connecting the cooling-pipe loops 5 to a cooling-water circulating system (not shown), the micro-plasma build-up welding can be started by means of the welding device 14 in order to supply the component part 2 with material in the area a×b.

After a repair process, the whole sheet-metal tank 13, including the content, is heated to about 150° C., so that the meltable alloy 10 is liquified, and the repaired part 2 can be separated again from the liquified alloy.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A process for creating a support means, for welding treatment of a component part to be reworked and/or repaired, the component part having areas to be supported during welding treatment, comprising the steps of placing cooling means in a support area to be cooled during welding treatment of the component, pouring a meltable alloy around the surfaces of the component that are to be supported, the meltable alloy in the cooled state supporting the component, embedding the cooling means during the pouring process with the meltable alloy and allowng access to the cooling means from outside the poured alloy, and removing the meltable alloy after the welding treatment of the component part by heating said meltable alloy.

2. A process according to claim 1, further comprising reusing the removed meltable alloy for another pouring process.

3. A process according to claim 1, wherein the cooling means comprise cooling pipes and further comprising reusing the cooling pipes for another pouring process.

4. A process according to claim 1, further comprising the step of removing the meltable alloy after the welding treatment of the component by heating the alloy to about 150° C.

5. A process according to claim 1, wherein the meltable alloy by being heated at about 150° C. is first roughly removed from the component part, and further comprising the step of cleaning the component part subsequently to remove alloy residues.

6. A process according to claim 1, further comprising the step of coating at least one of the component parts and the cooling means with a parting agent at the areas to be supported prior to the pouring step.

7. A process according to claim 1, wherein the cooling means are comprised of a good heat conducting material.

8. A process according to claim 1, comprising the further step of prestressing the component part in at least one area thereof prior to the step of pouring the meltable alloy.

9. A process according to claim 8, wherein the prestressing step further comprises prestressing locally the component part in plural areas thereof.

10. A welding device for a component part in accordance with claim 11, further comprising means for prestressing at least one local area of the component part.

11. A process for creating a support means, for welding treatment of a component part to be one of reworked and repaired, the component part having areas to be supported during welding treatment, comprising the steps of placing cooling means in a support area to be cooled during welding treatment of the component, pouring a meltable alloy around the surfaces of the component that are to be supported, the meltable alloy in the cooled state supporting the component, conducting heat generated during welding treatment from the component part through the alloy to the cooling means.

12. A process in accordance with claim 11 further comprising the step of removing the meltable alloy after the welding treatment of the component part by heating said meltable alloy.

13. A process according to claim 11, further comprising the step of reusing the removed meltable alloy for another pouring process.

14. A process according to claim 11, further comprising the step of prestressing the component part in at least one area thereof prior to the step of pouring the meltable alloy.

* * * * *